(12) United States Patent
Okamoto et al.

(10) Patent No.: US 10,237,397 B2
(45) Date of Patent: Mar. 19, 2019

(54) ELECTRONIC TERMINAL WITH MOTION-BASED FUNCTION RESTRICTION

(71) Applicant: KYOCERA Corporation, Kyoto-shi, Kyoto (JP)

(72) Inventors: Katsuhiro Okamoto, Tokyo (JP); Ayaka Tanaka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/666,536

(22) Filed: Aug. 1, 2017

(65) Prior Publication Data
US 2017/0331944 A1    Nov. 16, 2017

Related U.S. Application Data

(63) Continuation of application No. 15/106,316, filed as application No. PCT/JP2014/083615 on Dec. 18, 2014, now Pat. No. 9,749,460.

(30) Foreign Application Priority Data

Dec. 24, 2013    (JP) .................................. 2013-265037

(51) Int. Cl.
*H04W 24/00* (2009.01)
*H04M 1/725* (2006.01)
*H04W 4/02* (2018.01)

(52) U.S. Cl.
CPC ... *H04M 1/72577* (2013.01); *H04M 1/72569* (2013.01); *H04W 4/027* (2013.01)

(58) Field of Classification Search
CPC ......... H04M 1/72577; H04M 1/72569; H04W 4/027

USPC ...................................................... 455/456.4
See application file for complete search history.

(56) References Cited

U.S. PATENT DOCUMENTS

| | | | |
|---|---|---|---|
| 9,078,116 B2 * | 7/2015 | Abramson | H04L 67/12 |
| 9,749,460 B2 * | 8/2017 | Okamoto | H04M 1/72577 |
| 2009/0307633 A1 * | 12/2009 | Haughay, Jr. | G06F 1/1626 |
| | | | 715/841 |
| 2010/0164909 A1 * | 7/2010 | Momono | G06F 1/1624 |
| | | | 345/184 |
| 2010/0179757 A1 * | 7/2010 | Iketani | G01S 19/34 |
| | | | 701/472 |

FOREIGN PATENT DOCUMENTS

| | | |
|---|---|---|
| JP | 2008-205573 A | 9/2008 |
| JP | 2010-81319 A | 4/2010 |
| JP | 2012-209820 A | 10/2012 |
| JP | 2012-244207 A | 12/2012 |

OTHER PUBLICATIONS

International Search Report in PCT/JP2014/083615, dated Mar. 10, 2015.

* cited by examiner

*Primary Examiner* — Amancio Gonzalez
(74) *Attorney, Agent, or Firm* — Hauptman Ham, LLP

(57) ABSTRACT

In an aspect of the invention, an electronic device includes an acceleration sensor and a controller. The acceleration sensor detects acceleration. The controller discriminates a type of moving state based on a detection result of the acceleration sensor, and restricts a function according to the discriminated type.

5 Claims, 2 Drawing Sheets

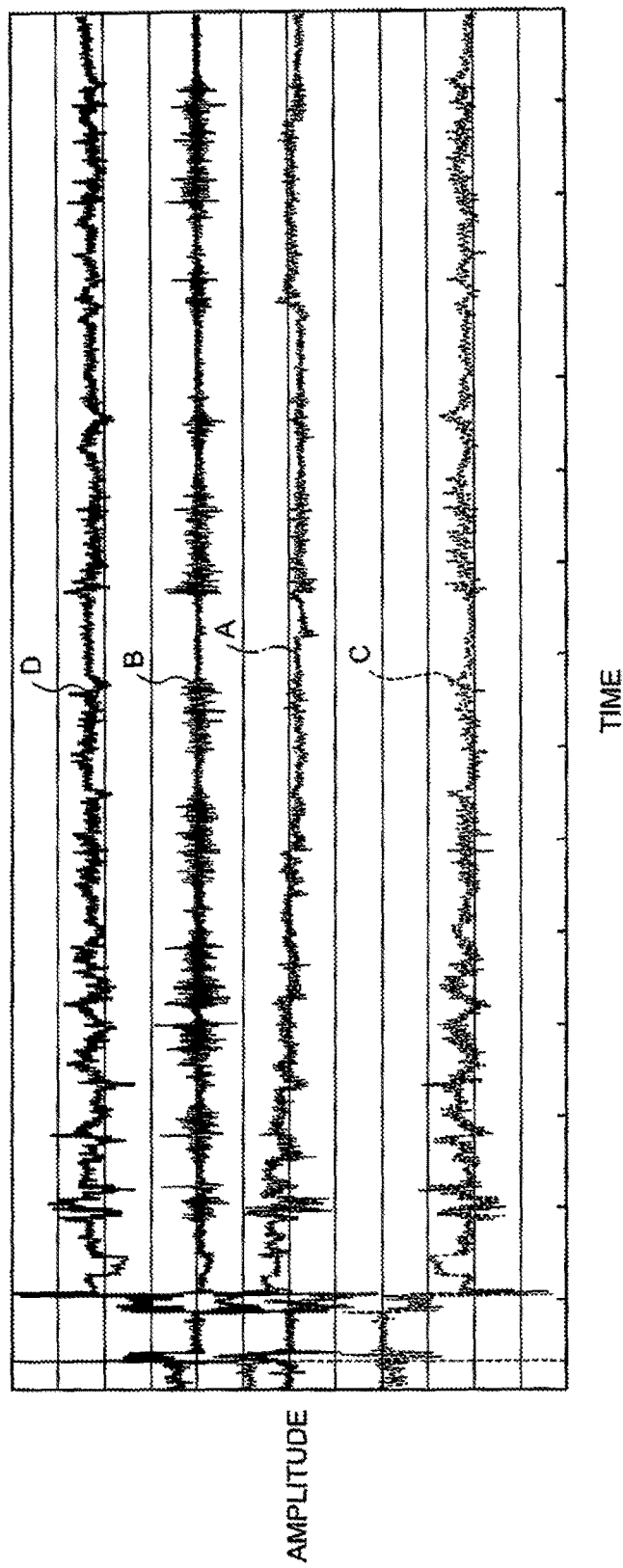

ELECTRONIC TERMINAL WITH MOTION-BASED FUNCTION RESTRICTION

RELATED APPLICATIONS

The present application is a continuation of U.S. patent application Ser. No. 15/106,316 filed on Jun. 20, 2016, which is a National Phase of International Application Number PCT/JP2014/083615, filed Dec. 18, 2014, which claims priority to Japanese Application Number 2013-265037, filed Dec. 24, 2013. The disclosures of all of the above-listed prior-filed applications are hereby incorporated by reference herein in their entirety.

FIELD

The present disclosure relates to a mobile electronic device.

BACKGROUND

Conventionally, there is a type, in an electronic device, that restricts a function when a predetermined condition is satisfied.

SUMMARY

A wide variety of functions is incorporated in current electronic devices. There is room for improvement in the function restriction of the electronic devices.

According to one aspect, there is provided an electronic device including an acceleration sensor configured to detect acceleration, and a controller configured to discriminate a type of moving state based on a detection result of the acceleration sensor and to restrict a function according to the discriminated type.

Advantageous Effects of Invention

According to the aspect, it is possible to provide an electronic device for restricting a function according to a moving state.

BRIEF DESCRIPTION OF DRAWINGS

FIG. 2 is a diagram schematically illustrating a result of detection of an acceleration sensor.

DESCRIPTION OF EMBODIMENTS

Figure 1:
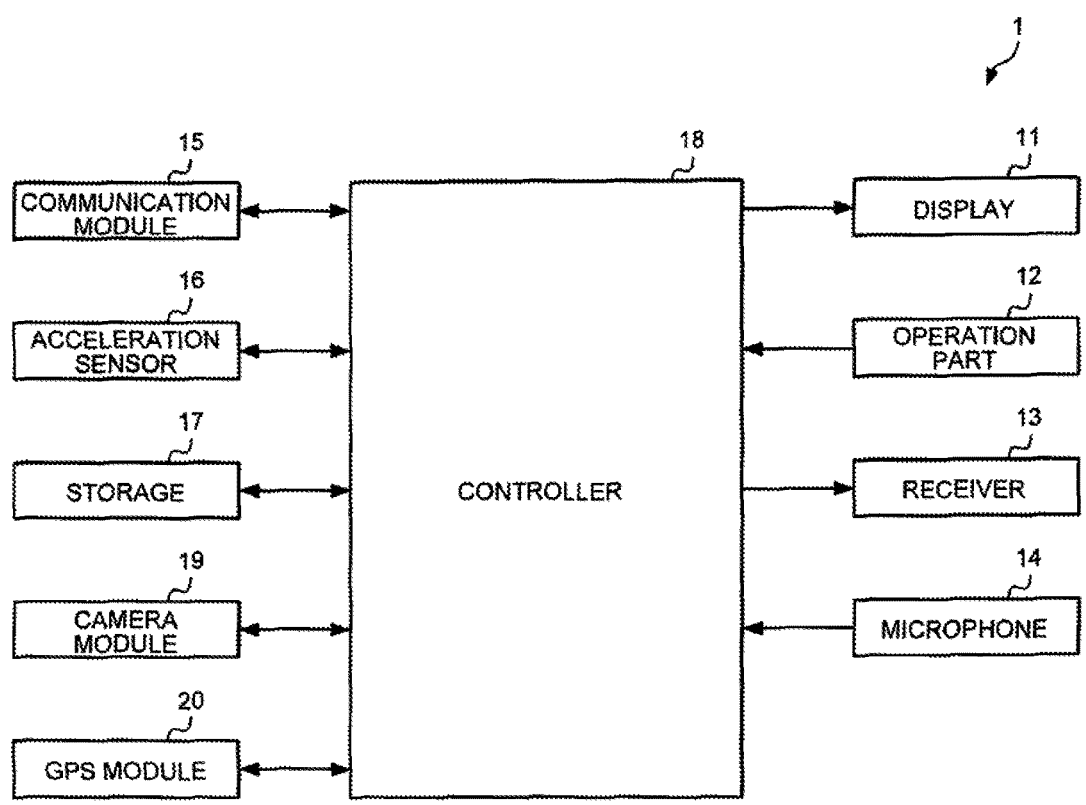
FIG. 1 is a block diagram illustrating a configuration of a mobile phone.

Embodiments for implementing the present invention will be explained in detail with reference to the accompanying drawings. A mobile phone 1 will be explained below as an example of the electronic device.

As illustrated in FIG. 1, the mobile phone 1 includes a display 11, an operation part 12, a receiver 13, a microphone 14, a communication module 15, an acceleration sensor 16, a storage 17, a camera module 19, a GPS (Global Positioning System) module 20, and a controller 18.

The display 11 includes a display device such as a liquid crystal display, an organic EL (Electro-Luminescence) display, an inorganic EL display, or an MEMS (Micro Electro Mechanical Systems) shutter display. The display 11 displays texts, images, signs, or graphics, etc.

The operation part 12 includes a plurality of buttons, and is operated by a user. The operation part 12 may also include a single button. The operation part 12 may include a button displayed on the display 11.

The receiver 13 converts a sound signal transmitted from the controller 18 into sound and outputs the sound.

The communication module 15 includes an antenna (not illustrated) and an RF (Radio Frequency) circuit module (not illustrated). The communication module 15 performs communication by using communication systems respectively corresponding to a plurality of wireless communication standards. The communication module 15 enables communication by at least one of a cellular-phone communication standard such as 2G, 3G, and 4G, and a wireless LAN (Local Area Network) system. The communication module 15 enables communication by a wireless communication system, which is the wireless LAN system, based on IEEE 802.11, for example, WiFi (registered trademark) wireless communication system. The communication module 15 may perform communication by a wireless communication system of WiMAX (Worldwide Interoperability for Microwave Access) (registered trademark). The antenna and the RF circuit module are provided in plurality corresponding to a plurality of communication systems.

The acceleration sensor 16 detects a direction and magnitude of acceleration acting on the mobile phone 1 and outputs the result of detection to the controller 18. The acceleration sensor 16 is a three dimensional (three-axis) type for detecting accelerations in an X-axis direction, a Y-axis direction, and a Z-axis direction.

The acceleration sensor 16 is configured with, for example, a piezoresistive type sensor or a capacitive type sensor, but the configuration of the acceleration sensor 16 is not limited thereto. For example, the acceleration sensor 16 may be configured with a piezoelectric element (piezoelectric type), an MEMS type using a heat-sensitive type, a servo type moving a moving coil and returning it to its original place by a feedback current, or a strain gauge type measuring a strain produced due to acceleration using a strain gauge.

The storage 17 is used for computation by the controller 18. The storage 17 includes, for example, memory. The storage 17 stores one or more applications that operate inside of the mobile phone 1. The storage 17 may also function as a removable external memory.

The camera module 19 images a subject. The camera module 19 acquires at least either one of a still image and a moving image.

The GPS module 20 acquires information for a current position of the mobile phone 1 based on the reception of signals from a plurality of GPS satellites.

The controller 18 controls the whole of the mobile phone 1. The controller 18 includes a CPU (Central Processing Unit) or the like.

The processing for detection results of the acceleration sensor 16 performed by the controller 18 will be explained below. Transmitted to the controller 18 are, as illustrated in FIG. 2, an acceleration in an X-axis direction (A in FIG. 2), an acceleration in a Y-axis direction (B in FIG. 2), an acceleration in a Z-axis direction (C in FIG. 2), and a vector value (D in FIG. 2) obtained by combining the accelerations of the axes, as the detection results of the acceleration sensor 16. The controller 18 logs the combined vector value. The controller 18 analyzes the logged data and discriminates a state of the mobile phone 1. The logged data is stored in the storage 17. The discrimination of the state by the acceleration may be implemented by independently analyzing each of the X-axis, the Y-axis, and the Y-axis.

When the state of the mobile phone 1 is to be discriminated, the controller 18 uses, for example, an acceleration pattern. The acceleration pattern is corresponded to, for example, each of a stop state or of a plurality of moving states which are previously stored in the storage 17. The acceleration pattern is a pattern obtained by previously measured and extracted what kind of acceleration pattern is characteristically detected by the acceleration sensor 16. The acceleration pattern includes, for example, a case in which the mobile phone 1 is in a stop state, a case in which the user carrying the mobile phone 1 is walking, or a case in which the user is riding a bicycle. In the present embodiment, the acceleration patterns corresponding to the logged data of the combined vector value are previously stored in the storage 17 in, for example, each of the stop state or of the moving states. The controller 18 compares the logged data of the combined vector value with the acceleration pattern to discriminate the state of the mobile phone 1.

Specifically, the controller 18 discriminates which of the stop state or any one of the moving states the mobile phone 1 is, based on the acceleration detected by the acceleration sensor 16.

For example, the controller 18 discriminates which state of the stop state and any one of a first moving state to a fifth moving state, explained later, the mobile phone 1 is in. The stop state is, for example, a state in which the mobile phone 1 is carried by the user but the user is not moving and a state in which the mobile phone 1 is on a table or the like. The controller 18 can discriminate that it is the stop state when the acceleration sensor 16 does not detect a predetermined acceleration or when the detected acceleration is smaller than a predetermined value.

The controller 18 discriminates any one of the first moving state to the fifth moving state which are explained later, and thereby enables discrimination as to whether the user is riding on any one of a bicycle, a car, a train, and any other transport means, or is walking.

The first moving state is a state in which the user of the mobile phone 1 is not on a vehicle, in other words, a walking state. The second moving state is a state in which the user is moving by car. The third moving state is a state in which the user is moving by bicycle. The fourth moving state is a state in which the user is moving by train. The fifth moving state is a state in which the user is moving by any other transport means.

The controller 18 discriminates a type of moving state based on the detection result of the acceleration sensor 16, and restricts a function according to the discriminated type. The controller 18 discriminates among the walking state, the state of riding in a car, the state of riding a bicycle, and the like as a type of the moving state. In other words, as described above, the controller 18 discriminates which of the first to the fifth moving states the mobile phone 1 is in, as discrimination of the type of the moving state.

The function includes a plurality of functions. For example, the functions are selected from among a plurality of functions including a mail function, a game function, a camera function, an Internet function, a map display function, and a music function. The mail function is a function of transmitting a composed mail to the other party and displaying a mail received from the other party on the display 11 via, for example, the communication module 15. The game function is a function of executing, for example, a game application stored in the storage 17. The camera function is a function of imaging, for example, a subject as a still image or a moving image using the camera module 19. The Internet function is a function of acquiring information based on, for example, connection to an external server (not illustrated) via the communication module 15 and displaying the information on the display 11. The map display function is a function of acquiring a current position of the mobile phone 1 using, for example, the GPS module 20 and displaying the current position on a map displayed on the display 11. The music function is a function of playing back a music using, for example, a music playing back application stored in the storage 17. These functions can be referred to as applications. In the present embodiment, an example will be explained below in which the mobile phone 1 has all of the mail function, the game function, the camera function, the Internet function, the map display function, and the music function.

The controller 18 restricts any of the functions according to the discriminated type. For example, the controller 18 restricts a specific function in terms of a case where execution of the function in the discriminated moving state may expose the user to danger or may become a nuisance to the people around, or the like. In other words, the controller 18 restricts any of the applications according to the discriminated type.

The mobile phone 1 is configured to predetermine a function to be restricted when the state is discriminated as, for example, the first moving state. The mobile phone 1 is configured to predetermine a function to be restricted when the state is discriminated as, for example, the second moving state. The mobile phone 1 is configured to predetermine a function to be restricted when the state is discriminated as, for example, the third moving state. The mobile phone 1 is configured to predetermine a function to be restricted when the state is discriminated as, for example, the fourth moving state. The mobile phone 1 is configured to predetermine a function to be restricted when the state is discriminated as, for example, the fifth moving state. The information for the settings (hereinafter, setting information) is stored, for example, in the storage 17. When it is discriminated as any one of the first to the fifth moving states, the controller 18 specifies the function to be restricted by referring to the setting information stored in the storage 17. The controller 18 specifies the function, and restricts the specified function.

As a specific example, when it is determined as the first moving state, the controller 18 restricts the mail function, the game function, the camera function, and the Internet function. On the other hand, when it is determined as the first moving state, the controller 18 does not restrict the map display function and the music function.

When it is determined as the second moving state, the controller 18 restricts the mail function, the game function, the camera function, and the Internet function. On the other hand, when it is determined as the second moving state, the controller 18 does not restrict the map display function and the music function.

When it is determined as the third moving state, the controller 18 restricts the mail function, the game function, the camera function, the Internet function, and the music function. On the other hand, when it is determined as the third moving state, the controller 18 does not restrict the map display function.

When it is determined as the fourth moving state, the controller 18 does not restrict any of the functions.

Thereby the mobile phone 1 restricts the function according to the moving state. For example, the mobile phone 1 will not accept an operation of the user while walking. The mobile phone 1 can prevent the user who is walking from concentrating on the operation of the mobile phone 1. The mobile phone 1 can prompt the user to use it moderately.

The controller 18 performs at least one of the following first to third matters as the restriction of the function.

The first matter is not to activate an application for performing a restricted function. The first matter is implemented in order to prevent a function not currently executed from being executed from now on.

The second matter is to terminate an application for performing a restricted function. The second matter is implemented in order to terminate the currently executed function and prevent the function from being executed thereafter.

The third matter is not to perform output based on an operation of an application for performing a restricted function. The third matter is implemented in order to partially restrict the operation of the application. To explain using the music function as an example, the third matter is not to display an image based on the music playing back application on the display 11 or is not to output music played back by the music playing back application through an earphone (not illustrated).

Accordingly, the mobile phone 1 can prevent the user who is moving from concentrating on the operation of the mobile phone 1. The mobile phone 1 can prompt the user to use it moderately.

When the application for performing a restricted function is to be terminated as the restriction of the function, the controller 18 outputs a warning before the application is ended. For example, the controller 18 displays a popup, as an output of the warning, to the effect that the application is to be terminated on the display 11.

Accordingly, the mobile phone 1 can prevent the user from being surprised due to a sudden stop of the function. The mobile phone 1 outputs the warning, which can cause the user to recognize the moving state. In other words, the mobile phone 1 can prompt the user to use it moderately.

The embodiments have explained the mobile phone 1 as an example of the electronic device. However, the present invention is not limited to the embodiments. The electronic device may be, for example, a mobile information terminal or a portable gaming device.

The invention claimed is:

1. An electronic device, comprising:
   an acceleration sensor configured to detect acceleration;
   a controller configured to discriminate a type of moving state based on a detection result of acceleration sensor, and to restrict a function of the electronic device according to the discriminated type; and
   a storage configured to store setting information containing the function to be restricted,
   wherein
   the function to be restricted is predetermined for each moving state,
   the controller is configured to specify the function to be restricted by referring to the setting information stored in the storage, and restrict the specified function, and
   the controller is configured to execute, as the restriction of the function, at least one of
      an application for performing the restricted function is not activated,
      an application for performing the restricted function is terminated, and
      an output based on an operation of an application for performing the restricted function is not performed.

2. The electronic device according to claim 1, wherein
the function to be restricted includes a plurality of functions, and
the controller is configured to restrict any of the plurality of functions according to the discriminated type.

3. The electronic device according to claim 2, wherein
the plurality of functions includes at least two among a mail function, a game function, a camera function, an Internet function, a map display function, and a music function.

4. The electronic device according to claim 1, wherein
the controller is configured to
   terminate, as the restriction of the function, the application for performing the restricted function, and
   output a warning before the application is terminated.

5. The electronic device according to claim 1, wherein
the controller is configured to discriminate the type of moving state as one of a walking state, a running state, a state of riding on a bicycle, or a state of riding in a vehicle.

* * * * *